(12) United States Patent
Mukherjee

(10) Patent No.: US 7,949,444 B2
(45) Date of Patent: May 24, 2011

(54) AVIATION FIELD SERVICE REPORT NATURAL LANGUAGE PROCESSING

(75) Inventor: Joydeb Mukherjee, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 862 days.

(21) Appl. No.: 11/245,659

(22) Filed: Oct. 7, 2005

(65) Prior Publication Data
US 2007/0083300 A1    Apr. 12, 2007

(51) Int. Cl.
G06F 7/00 (2006.01)
G06F 17/00 (2006.01)

(52) U.S. Cl. ............ 701/29; 701/1; 701/3; 701/35; 702/183; 702/185; 702/187; 704/9

(58) Field of Classification Search .......... 701/1, 3, 701/29, 35; 704/9; 702/183, 185, 187
See application file for complete search history.

(56) References Cited

U.S. PATENT DOCUMENTS

| | | | |
|---|---|---|---|
| 4,692,896 A * | 9/1987 | Sakoda et al. ............... | 717/142 |
| 4,914,590 A | 4/1990 | Loatman et al. | |
| 4,994,966 A | 2/1991 | Hutchins | |
| 5,259,067 A | 11/1993 | Kautz et al. | |
| 5,418,717 A * | 5/1995 | Su et al. ............... | 704/9 |
| 5,642,522 A | 6/1997 | Zaenen et al. | |
| 5,644,686 A | 7/1997 | Hekmatpour | |
| 5,708,829 A | 1/1998 | Kadashevich et al. | |
| 5,717,914 A * | 2/1998 | Husick et al. ........... | 1/1 |
| 5,748,841 A | 5/1998 | Morin et al. | |
| 6,246,977 B1 | 6/2001 | Messerly et al. | |
| 6,356,864 B1 | 3/2002 | Foltz et al. | |
| 6,446,081 B1 * | 9/2002 | Preston ............... | 1/1 |
| 6,571,236 B1 * | 5/2003 | Ruppelt ............... | 707/3 |
| 6,609,091 B1 | 8/2003 | Budzinski | |
| 2003/0105638 A1 * | 6/2003 | Taira ............... | 704/275 |
| 2003/0158736 A1 * | 8/2003 | James et al. ............... | 704/270.1 |
| 2004/0003318 A1 * | 1/2004 | Felke et al. ............... | 714/25 |
| 2004/0039499 A1 * | 2/2004 | Felke et al. ............... | 701/29 |
| 2005/0131874 A1 * | 6/2005 | Verbitsky ............... | 707/3 |

OTHER PUBLICATIONS

Carreras, X. et al., "Lecture Notes in Computer Science, vol. 2430", *Learning and Inference for Clause Identification*, Proceedings of Machine Learning: ECML 2002: 13th European Conference on Machine Learning, Helsinki, Finland, Aug. 19-23, 2002,(2002),35-47.

Ganesan, P., et al., "Exploiting Hierarchical Domain Structure to Compute Similarity", *ACM Transactions on Information Systems*, 21(1), (2003),64-93.

Leffa, V. J., "Clause Processing in Complex Sentences", *Proceedings of the First International Conference on Language Resources and Evaluation*, vol. 2, http://www.leffa.pro/br/granada.htm,(1998),937-943

Nenadic, G., et al., "Automatic Discovery of Term Similarities Using Pattern Mining", *Proceedings of the 2nd International Workshop on Computational Terminology (CompuTerm 2002)*, (2002), 43-49.

* cited by examiner

*Primary Examiner* — Jack Keith
*Assistant Examiner* — Chuong P Nguyen
(74) *Attorney, Agent, or Firm* — Ingrassia Fisher & Lorenz, P.C.

(57) ABSTRACT

An aircraft service information handling system comprises an input module operable to collect field service narrative data. A natural language data extraction module extracts problem data and related solution data from the narrative data, and a database module populates an aircraft service information database with the extracted problem data and the related extracted solution data. The database module further searches the database for populated problem data, and retrieves the related populated solution data.

17 Claims, 3 Drawing Sheets ized system, oper-

AVIATION FIELD SERVICE REPORT NATURAL LANGUAGE PROCESSING

FIELD OF THE INVENTION

The invention relates generally to managing aviation field service data in a service record, and more specifically to natural language process extraction of data from service reports and management of such data in a maintenance information database.

BACKGROUND

Maintenance of aviation equipment is a significant expense for any aircraft owner, and is a primary concern for safety of the aircraft. While an automobile that experiences mechanical trouble such as an engine problem can usually pull the vehicle over and wait for repairs to be made, a similar engine failure in an aircraft flying at tens of thousands of feet can be more troublesome. For this reason, regular maintenance and service of aviation engines and other such aircraft systems is mandated by federal agencies, and is performed regularly to ensure the reliable operation of the airplane.

Because the equipment, parts, and labor involved with aircraft maintenance are all relatively expensive, aircraft operators desire to minimize the cost involved while ensuring that their aircraft remain safe and reliable. Because it is difficult and potentially unsafe to try to cut costs on parts or on maintenance equipment, some of this effort in controlling cost is directed toward reducing labor by keeping fault diagnosis and related maintenance operation costs to a minimum. This can be achieved by good engineering of the aircraft and its systems, and by good training or extensive experience for the maintenance personnel servicing the aircraft. Fast and efficient diagnosing of a problem results in a decrease in time and labor spent fixing a given problem, and results in a reduction of resource consumption such as service hangar time and loss of the aircraft for normal flight operations.

The maintenance personnel typically generate what are known as field service reports, or FSRs, to document their service work in diagnosing and repairing an aircraft fault. The field service report typically comprises an unstructured written narrative that describes the symptoms observed that indicated service was necessary, the actions taken in diagnosing and repairing the aircraft, the parts and equipment used, and the eventual solution to the fault. This information serves as a record of what has happened, and as an indicator of what may work to solve problems having certain symptoms or that are diagnosed based on certain observations or problems.

It is therefore desired to more effectively use aviation field service report data to make service of aircraft more efficient and cost-effective.

SUMMARY

In one example embodiment of the invention, an aircraft service information handling system comprises an input module operable to collect field service narrative data. A natural language data extraction module extracts problem data and related solution data from the narrative data, and a database module populates an aircraft service information database with the extracted problem data and the related extracted solution data. The database module further searches the database for populated problem data, and retrieves the related populated solution data.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

One embodiment of the invention comprises an aircraft service information handling system having an input module operable to collect field service narrative data. A natural language data extraction module extracts problem data and related solution data from the narrative data, and a database module populates an aircraft service information database with the extracted problem data and the related extracted solution data. When a user has identified a problem with an aircraft and seeks maintenance information, the user uses the database module to search the database for populated problem data, and retrieves the related populated solution data. The user the is able to use the retrieved solution data as a resource in troubleshooting and repairing the aircraft problem.

Figure 1:
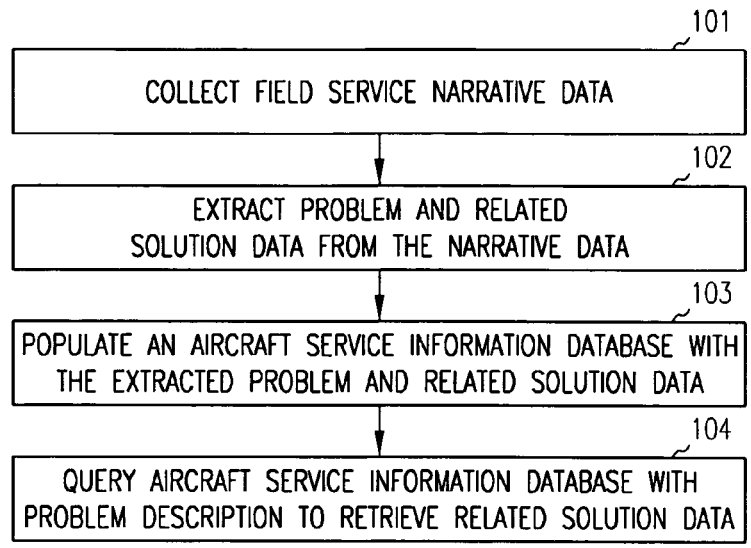
FIG. 1 is a flowchart of a method of manufacturing paper, consistent with an example embodiment of the present invention.

FIG. 1 is a flowchart illustrating a method of practicing one example embodiment of the invention. At 101, field service narrative data is collected. The field service narrative data is typically a handwritten description of a problem and a solution to the problem that a service technician drafts as a record of repair or maintenance activity when servicing an aircraft, but in other embodiments is a spoken or typed narrative that is converted to a computer-readable form such as by voice recognition. The narrative in various environments will comprise sentence fragments or phrases, along with full sentences, descriptive words, and other narrative elements. It is also common for such narratives to contain abbreviations and slang terms, such as using "chk" to represent the word "check" or "checked", and "repl" to represent "replaced" when referring to maintenance or repair operations. Similarly, test equipment and parts may be referred to using slang terms rather than the official technical terms.

The narratives are also likely in many environments not to be grammatically correct, making extraction of problem and related solution data from the narrative data at 102 a more complex task. The unstructured narrative text is in one embodiment of the invention processed via software executing on a computerized system, using algorithms designed to parse the constituents of natural language. The natural language processing algorithms in a further embodiment use training material to learn to distinguish words, phrases, or sentences relating to problem or symptom identification from those related to the solutions to problems. A database management function is able to categorize the problem or symptom, and to assign the problem and the related solution to a particular problem category. The stored problem and related solution data can then be searched using a language search or category search to retrieve solutions for problems similar to one a user is experiencing.

At 103, the problem and solution data extracted from the narrative are used to populate an aircraft service information database. In a further embodiment, known common problems and solutions are further entered into the aircraft service information database to provide an initial knowledge base from which the database is further built based on the collected field service narrative data.

When a service technician is having difficulty diagnosing a problem, the technician can use symptom or problem descriptions to search the aircraft service information database, and can retrieve those problems and solutions most related to the observed problem or symptoms at 104. Alternately, the service technician can browse problems and their solutions using the problem categorization or classification as determined in the natural language processing and as stored along with the problem and solution data.

Figure 2:
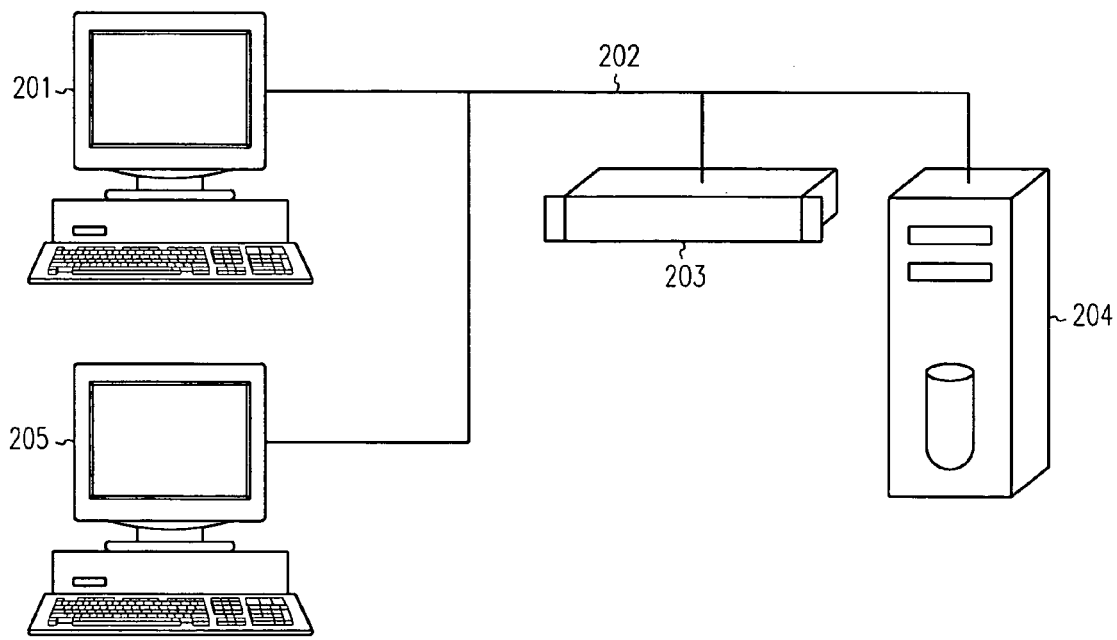
FIG. 2 is a block diagram of data utilization in a method of managing production of paper, consistent with an example embodiment of the present invention.

FIG. 2 shows an information handling system as may be used to practice an example embodiment of the invention. A first computer system 201 is used to record field service report data. In one embodiment, the field service report data is typed into the computerized system, such as by the service technician, from written notes, or as a transcription of a recorded vocal narrative. The computer system 201 sends the narrative data via a network 202 to a second computerized system 203, where natural language processing algorithms are employed to analyze the narrative and extract problem and related solution data. The problem data and the related solution data are then saved in a database in database server 204.

When a service technician is having difficulty diagnosing a problem, the technician can use a terminal 205 to query the data on database server 204. In one example, this is performed by entering one or more words or phrases describing the problem or symptoms. The description of the problem is sent to the database server, which compares the problem data stored in the database to the problem description the service technician submitted as a query. The database server then searches the database for those problem and related solution records that are most similar to the service technician's problem description, and displays the records found. The service technician can then view the solutions related to those problems most like the problem the technician is presently facing, and can benefit from the knowledge and experience of other service technicians.

Figure 3:
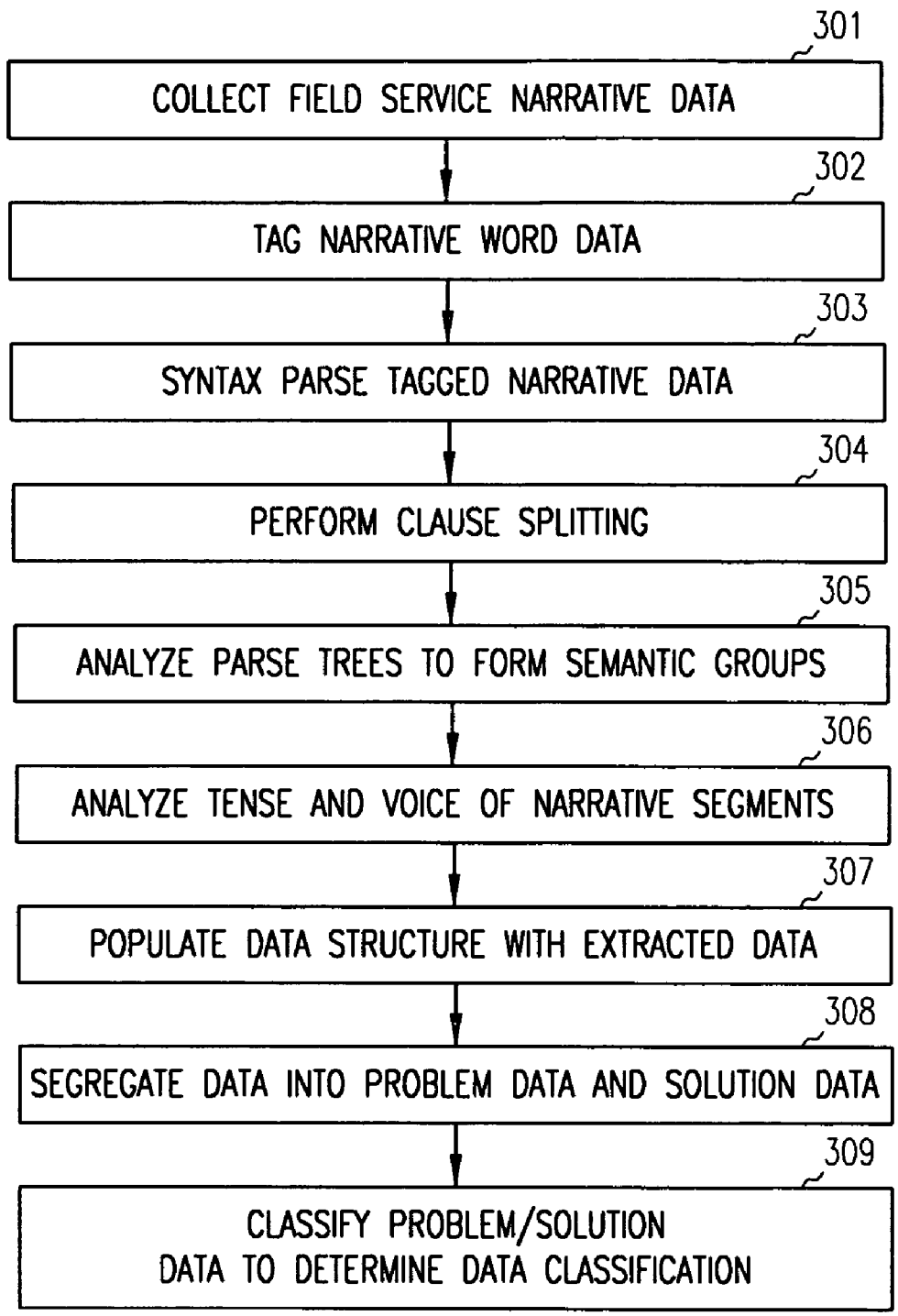
FIG. 3 is a detailed flowchart of a method of producing paper products, consistent with an example embodiment of the present invention.

FIG. 3 is a detailed flowchart of a method of practicing an example embodiment of the invention. At 301, field service narrative data is collected as at 101 of FIG. 1. At 302, the collected narrative data is tagged, as a part of the natural language processing function. The tagging process typically identifies each part of speech in the sentence, and in some further embodiments specially tags word such as "an", "or", and "the" that don't add meaning to a sentence or phrase. In some embodiments, the tagger will do a lexical analysis to determine which particular part of speech a particular word is, such as determining whether the term "running" is a noun, adjective, adverb, or gerund. The narrative is then parsed at 303 based on the syntax of the phrase or sentence, based on grammatical rules and statistical probabilities. After the parsing process is performed, clause splitting is performed at 304, to break the narrative up into independent clauses or phrases. Semantic groups within each clause or phrase are determined at 305, such that the various parts of speech in the clause are identified and can be grouped. At 306, characteristics of the parts of speech are identified, such as identifying a verb tense to determine whether an action has been completed, is being completed, or is to be completed.

The data extracted from the narrative is used to populate frames or other data structures at 307. The frames reference each linguistic element of a phrase or sentence, and store its apparent relation to other elements of the clause or sentence. The frame data is then manually segregated into problem data and associated solution data at 308, and is classified at 309 for use in populating a database or knowledge base of problems and their solutions. In a further embodiment, the frame data is automatically processed via an algorithm to determine based on lexical, syntactic, and semantic indicators which one of a number of categorized problem types to which the problem and related solution data are to be assigned.

The database of compiled problem data and associated solution data is employed in yet a further embodiment as a resource which a service technician may query for problems similar to a problem presently under investigation, so that the solutions to the found related problems can be considered in formulating a solution to the present problem. One example of such a system is shown and described in conjunction with FIG. 2, which illustrates how a service technician using a remote system such as 205 may query a database constructed from narrative data provided via a first terminal 201 through a database server 204.

Figure 4:
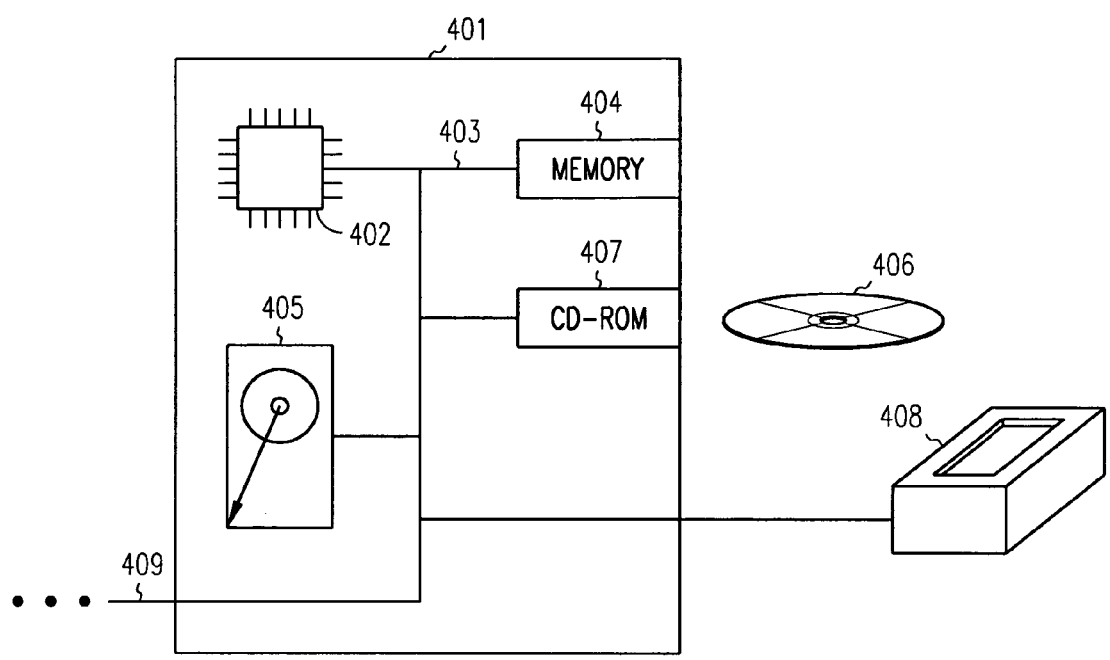
FIG. 4 is a block diagram of a computerized system, operable to execute machine-readable instructions for carrying out an example embodiment of the present invention.

FIG. 4 illustrates a more detailed example of a computerized system consistent with an example embodiment of the present invention. The computer 401 has a processor 402, couple via bus 403 to memory 404. A hard disk drive 405 stores program instructions and other data such as a database, such that the data can be retrieved from the hard disk drive and loaded into memory 404 for the processor 402's use. Some data stored on the hard disk drive, such as software or program application data is loaded from a machine-readable medium such as a compact disc 406, a diskette, a DVD, a network connection 409, or another such machine-readable medium via a media reader such as CD-ROM drive 407. A scanner 408 is further attached to the computerized system in this example, and is operable to scan papers and to send an electronic representation of the scanned images to the computerized system 401.

In operation, execution of a software program installed onto the computer system from a machine-readable medium causes at least a portion of the program to be loaded from the hard disk drive 405 into memory 404. The processor executes instructions comprising a part of the computer program, which causes the computer to perform the functions as dictated by the instructions. For example, one portion of such a software program will cause scanner 408 to scan field service reports, and to perform character recognition on at least a portion of the scanned image to create a machine-readable version of the field service report narrative. Other functions consistent with various embodiments of the invention, such as performing natural language processing functions and operation of a database of problems and their related solutions, are performed by the processor through execution of program instructions loaded into the processor from machine-readable mediums such as the CD-ROM 406, hard disk drive 405, and memory 404.

The example embodiments presented here illustrate how aircraft service information can be managed to provide a database of problems and their related solutions, and how such a database can be formed by natural language processing of field service report narratives. Such a system enables service technicians to benefit from the knowledge and experience of others, and provides for easy and efficient assembly of a repository of problem and repair knowledge. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A method of managing aircraft service information, comprising:
    collecting unstructured field service narrative data utilizing self-training natural language processing algorithms;
    performing a lexical analysis on the collected field service narrative data to identify the lexical class of each of a plurality of parts of speech existing therein;
    parsing the collected field service narrative data based at least in part on the identified lexical class of each of the plurality of parts of speech;
    extracting problem data from the narrative data based at least in part on the lexical analysis;
    extracting solution data from the narrative data,
    wherein at least one of extracting problem data and extracting solution data is performed on the narrative data automatically by machine, such that a text representation of the narrative data is processed by machine to distinguish and parse at least one of problem data and solution data from the narrative by the self-training natural language processing algorithms; and
    populating an aircraft service information database with the extracted problem data and the related extracted solution data.

2. The method of claim 1, wherein collecting field service narrative data comprises performing voice recognition on a spoken narrative and converting it to a machine-readable form.

3. The method of claim 1, wherein populating an aircraft service information database comprises storing extracted problem data and related extracted solution data.

4. The method of claim 1, wherein in at least one of extracting problem data and extracting solution data from the narrative data comprises analyzing linguistic relationships between words in at least a portion of the narrative.

5. The method of claim 1, wherein in at least one of extracting problem data and extracting solution data from the narrative data comprises analysis of statistical occurrence of specific words in at least a portion of the narrative.

6. The method of claim 1, further comprising searching the database for populated problem data, and retrieving the related populated solution data.

7. An aircraft service information handling system, comprising:
    an input module configured to collect unstructured field service narrative data utilizing self-training natural language processing algorithms;
    a self-training natural language data extraction module configured to extract problem data and related solution data from the narrative data, such that a text representation of the narrative data is processed by machine to distinguish and parse at least one problem data and solution data from the narrative; and
    a database module configured to populate an aircraft service information database with the extracted problem data and the related extracted solution data.

8. The aircraft service information handling system of claim 7, wherein the input module is configured to collect field service narrative data by at least one of performing voice recognition on a spoken narrative, and scanning a written narrative and converting it to a machine-readable form.

9. The aircraft service information handling system of claim 7, wherein the natural language data extraction module is configured to analyze linguistic relationships between words in at least a portion of the narrative.

10. The aircraft service information handling system of claim 7, wherein the natural language data extraction module is configured to analyze statistical occurrence of specific words in at least a portion of the narrative.

11. The aircraft service information handling system of claim 7, wherein the database module is further configured to search the database for populated problem data, and retrieving the related populated solution data.

12. A machine-readable medium with instructions stored thereon, the instructions when executed cause a computerized system to:
    collect unstructured field service narrative data utilizing self-trainable natural language processing algorithms;
    perform a lexical analysis on the collected field service narrative data identifying the lexical class of each of a plurality of parts of speech existing therein;
    extract problem data from the narrative data based at least in part on the lexical analysis;
    extract solution data from the narrative data, wherein at least one of extracting problem data and extracting solution data is performed on the narrative data automatically by machine, such that a text representation of the narrative data is processed by machine to distinguish and parse at least one problem data and solution data from the narrative; and
    populate an aircraft service information database with the extracted problem data and the related extracted solution data.

13. The machine-readable medium of claim 12, wherein collecting field service narrative data comprises performing voice recognition on a spoken narrative.

14. The machine-readable medium of claim 12, wherein populating an aircraft service information database comprises storing extracted problem data and related extracted solution data.

15. The machine-readable medium of claim 12, wherein in at least one of extracting problem data and extracting solution data from the narrative data comprises analyzing linguistic relationships between words in at least a portion of the narrative.

16. The machine-readable medium of claim 12, wherein in at least one of extracting problem data and extracting solution data from the narrative data comprises analysis of statistical occurrence of specific words in at least a portion of the narrative.

17. The machine-readable medium of claim 12, the instructions when executed further operable to cause the computerized system to search the database for populated problem data, and retrieving the related populated solution data.

* * * * *